United States Patent [19]

Heine

[11] Patent Number: 4,660,431
[45] Date of Patent: Apr. 28, 1987

[54] ROTARY MOTION LINEAR ACTUATOR

[75] Inventor: Otto R. Heine, Poway, Calif.
[73] Assignee: R&H Technology, Inc., Minneapolis, Minn.
[21] Appl. No.: 630,310
[22] Filed: Jul. 11, 1984
[51] Int. Cl.[4] ............................ F16H 1/18; F16H 1/20
[52] U.S. Cl. ............................... 74/424.8 R; 74/89.15
[58] Field of Search .................... 74/459, 216.3, 89.15, 74/424.8 R, 424.8 A

[56] References Cited

U.S. PATENT DOCUMENTS

| | | | |
|---|---|---|---|
| 2,230,049 | 1/1941 | Klamp | 74/208 |
| 2,642,756 | 6/1953 | Cummings | 74/665 |
| 2,722,845 | 11/1955 | Cummings | 74/354 |
| 2,733,615 | 2/1956 | Cummings | 74/354 |
| 3,186,250 | 6/1965 | Boutwell | 74/459 |
| 3,206,991 | 9/1965 | Lines et al. | 74/124 |
| 3,272,021 | 9/1966 | Weber | 74/25 |
| 3,302,477 | 2/1967 | Grabowski | 74/424.8 R |
| 3,425,284 | 2/1969 | Shelton | 74/25 |
| 3,443,443 | 5/1969 | Spence | 74/25 |
| 3,589,202 | 6/1971 | Stanley | 74/25 |
| 3,990,317 | 11/1976 | Gilman et al. | 74/25 |
| 4,074,587 | 2/1978 | Brusasco | 74/424.8 R |
| 4,141,255 | 2/1979 | Nilsson | 74/25 |
| 4,186,620 | 2/1980 | Brusasco | 74/424.8 R |
| 4,224,831 | 9/1980 | Nilsson | 74/89 |
| 4,246,802 | 1/1981 | Rasmussen et al. | 74/25 |
| 4,253,342 | 3/1981 | Uhing | 74/89 |
| 4,411,166 | 10/1983 | Marcovici | 74/89 |

FOREIGN PATENT DOCUMENTS

| | | | |
|---|---|---|---|
| 2810000 | 9/1978 | Fed. Rep. of Germany | 74/424.8 R |
| 3028543 | 2/1982 | Fed. Rep. of Germany | 74/424.8 R |
| 3105494 | 10/1982 | Fed. Rep. of Germany | 74/424.8 R |

OTHER PUBLICATIONS

Brochure entitled "ROH'LIX Linear Actuator", by Zero-Max Industries, Inc. of Minneapolis, Minn.
Brochure entitled "Thomson Star Ball Screw Assemblies", pp. 2 and 3, from Thomson Technical Bulletin, No. 25, of Thomson Industries, Inc., Port Washington, N.Y. 11050.
Brochure entitled "Thomson Ball Nut Linear Drive", 2 pages, from Thomson Technical Bulletin, No. 25, of Thomson Industries, Inc., Port Washington, N.Y. 11050.

Primary Examiner—Rodney H. Bonck
Assistant Examiner—Dirk Wright
Attorney, Agent, or Firm—Klein & Szekeres

[57] ABSTRACT

A rotary motion linear actuator is disclosed which is capable of substantial backlash or lost motion free operation. The rotary motion linear actuator includes a ball nut body having interior helical (Archimedes type) spiral grooves to contain a plurality of balls between the ball nut body and a rotatable shaft upon which the ball nut body is mounted in a substantially concentric relationship. A spiral slot is disposed in the ball nut body substantially parallel with the spiral grooves so as to effectively render the ball nut body capable of torsional deformation about its longitudinal axis, in analogy to a coil spring. The ball nut body carries an exterior torque tube or like mounting body, which holds the ball nut body in a predetermined torsionally deformed state. The balls disposed between the shaft and the ball nut body are therefore biased with a predetermined preload against the shaft, and the rotational axes of the balls are inclined relative to the longitudinal axis of the shaft. The shaft may have a substantially smooth exterior surface, or may incorporate helical spiral grooves to receive the balls.

15 Claims, 8 Drawing Figures

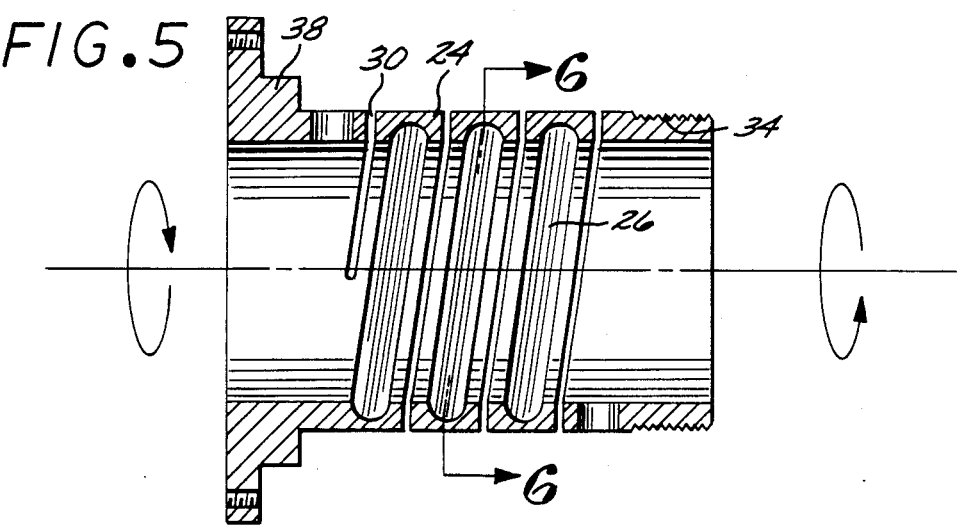
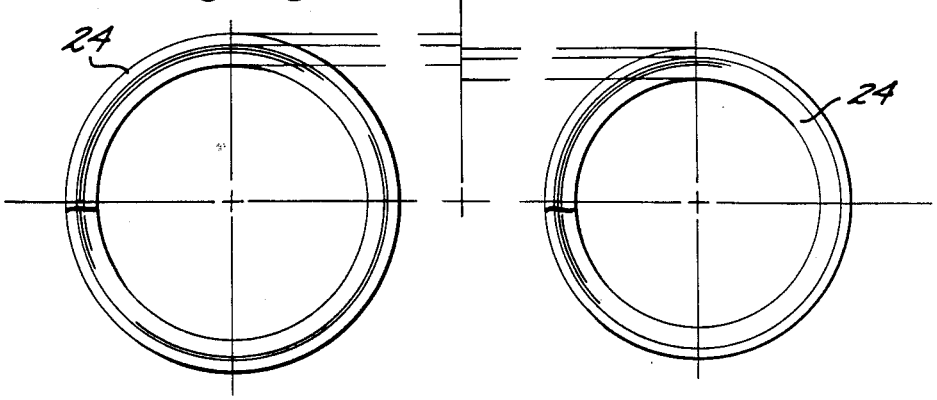
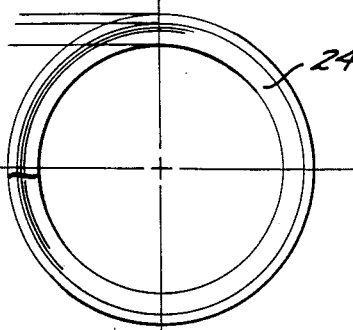
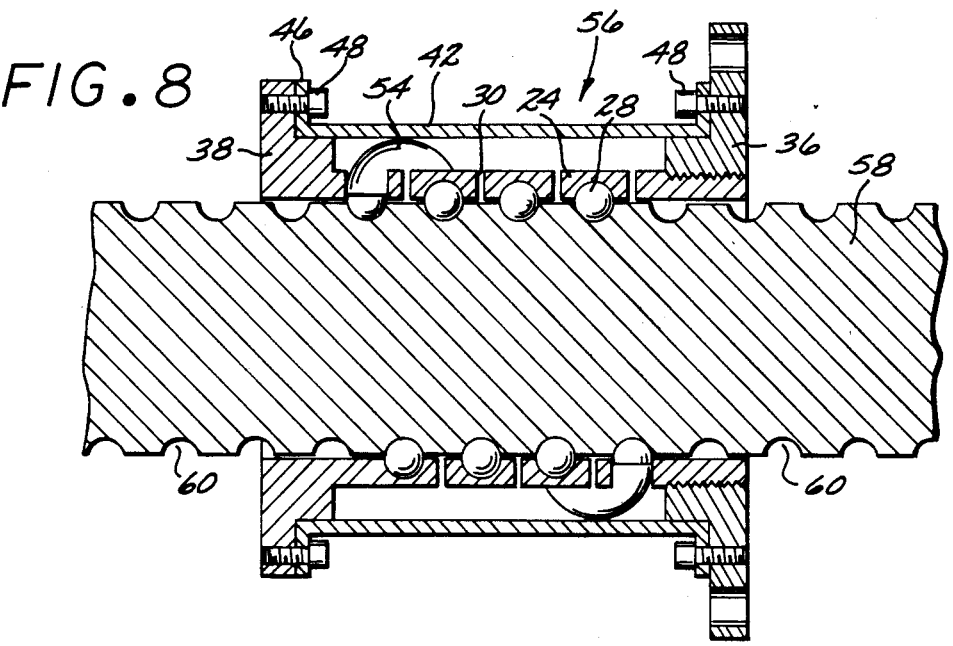

ROTARY MOTION LINEAR ACTUATOR

BACKGROUND OF THE INVENTION

1. Field of the Invention

The present invention is directed to rotary motion linear actuators. More particularly, the present invention is directed to improved a rotary motion linear actuators which operate substantially without backlash or lost motion.

2. Brief Description of the Prior Art

Devices are well known in the prior art which convert rotary motion of a shaft to linear motion of a structure mounted on the shaft. Such devices are often called rotary motion linear actuators.

In one type of rotary motion linear actuator known in the prior art, the shaft has a helical (Archimedes) screw thread and a complementarily threaded ball nut is mounted on the shaft. A plurality of balls are disposed between the ball nut and the shaft. A suitable tube or the like is affixed to the ball nut to circulate the balls between the two ends of spiral grooves disposed in the ball nut. An object, such as a machine part, carriage or other body to be moved linearly, is fixedly attached to the ball nut, and is further affixed to a third body so that the object can not rotate together with the shaft. Therefore, when the shaft rotates, the ball nut moves linearly on the shaft and carries the object. Such rotary motion linear actuators having a ball nut on a ball screw threaded shaft are often used for actuating carriages or other linearly moving parts of machinery which require great precision of movement.

Another type of rotary motion linear actuator of the prior art utilizes conventional, unthreaded shafts. A housing is mounted on the shaft and contains a plurality of roller bearing type rollers. The roller bearings are disposed with their rotational axes at an angle to the axis of rotation of the shaft and are urged by a spring force or the like against the shaft. Rotary motion linear actuators of this type are often used where only light power loads are transmitted, or where the rotary motion linear actuator is required to stall or slip when an overload is encountered. Such applications include actuating mechanisms for power doors, windows of automobiles, carriages in computer housing cabinets and the like.

U.S. Pat. Nos. 3,272,021; 4,411,166; 3,425,284; 3,990,317; 4,246,802, and 4,224,831 disclose rotary motion linear actuators or like devices of the above-described second type. U.S. Pat. Nos. 3,589,202 and 3,443,443 disclose rotary motion linear actuators which utilize balls, rather than rollers, pressed against a shaft to convert rotary motion of the shaft into linear motion of the housing for the balls. Additional disclosures relating to rotary motion linear actuators, or to similar speed changing or power transmitting devices, are found in U.S. Pat. Nos. 4,253,342; 4,141,255; 3,186,250; 3,206,991; 2,642,756; 2,722,845, and 2,733,615.

A prior art rotary motion linear actuator which is available commercially in the United States under the trade mark ROH'LIX, is described in a brochure of its manufacturer, Zero-Max Industries Inc. of Minneapolis, Minn. This rotary motion linear actuator, like other prior art devices, also utilizes rollers pressed against a shaft with the rotational angle of the rollers disposed at a small acute angle to the shaft.

The above-noted and other prior art rotary motion linear actuators are not, however, without disadvantages. One problem shared by many prior art rotary motion linear actuators, particularly by the ones having a smooth (unthreaded) shaft, is the relatively small force which can be transmitted through the devices. The rotary motion linear actuators having both helically threaded ball screw type shaft and matching threaded ball nuts, on the other hand, are relatively expensive to manufacture.

Another problem shared by the prior art rotary motion linear actuators is backlash or lost motion. As it will be readily appreciated by those skilled in the art, backlash or lost motion is particularly troublesome in certain applications, such as carriages of machine tools, where great precision of movement is required. The problem of backlash was occasionally solved in the prior art by mounting two spring-connected, axially offset ball nuts on the same threaded shaft so that a predetermined pre-load was attained on the shaft. This solution, however, increased the bulk and cost of the actuator.

In light of the foregoing, there is still need in the prior art for linear motion rotary actuators having increased ability to transmit force, minimal lost motion and relatively low manufacturing costs. The present invention provides a rotary motion linear actuator having such improved characteristics.

SUMMARY OF THE INVENTION

It is an object of the present invention to provide a rotary motion linear actuator which is compact and is capable of transmitting large forces relative to its size.

It is another object of the present invention to provide a rotary motion linear actuator which is relatively inexpensive to manufacture.

It is still another object of the present invention to provide a rotary motion linear actuator which is capable of substantially backlash or lost motion free operation.

It is yet another object of the present invention to provide a rotary motion linear actuator wherein pre-load of balls urged against an actuator shaft is readily adjusted at the option of an operator.

The foregoing and other objects and advantages are attained by a rotary motion linear actuator which includes a ball nut type body having interior, helical ball screw type spiral grooves. The ball nut is mounted in a substantially concentric relationship with a shaft, and a plurality of balls are mounted between the ball nut and the shaft. The ball nut type body is capable of being torsionally deformed to a desired extent relative to its longitudinal axis so that the diameter of the ball nut is contracted in the torsionally deformed state. This is best accomplished by providing a helical slot in the ball nut substantially parallel with the spiral grooves, whereby the ball nut, in effect, behaves like a coil spring. The ball nut is mounted in a torsionally deformed state to a tube or like device which is carried by the ball nut, whereby the balls are pressed against the shaft with a predetermined pre-load.

A flange or like member is also carried by the ball nut type body to permit mounting an object, such as a machine part or carriage, which is to be linearly moved on the shaft.

A tube, conduit or like device connects the ends of the spiral grooves in the ball nut, to permit circulation of the balls as the actuator moves linearly on the rotating shaft.

In one embodiment of the invention the shaft has a smooth exterior surface. In this embodiment linear motion of the actuator on the shaft is accomplished because the rotational axes of the balls are inclined relative to the rotational axis of the shaft by virtue of the torsionally deformed state of the ball nut.

In another embodiment of the invention the shaft also has helical, ball screw type spiral grooves. In this embodiment, backlash or lost motion is prevented because the torsionally deformed ball nut urges the balls into the grooves of the shaft with a predetermined pre-load.

The features of the present invention can be best understood, together with further objects and advantages, by reference to the following description, taken in connection with the accompanying drawings.

BRIEF DESCRIPTION OF THE DRAWINGS

FIG. 5 is a cross-sectional view of the modified ball nut shown on FIG. 4, the cross-section being taken on lines 5,5 of FIG. 4;

FIGS. 6 and 7 are schematic views showing contraction of the modified ball nut of the rotary motion linear actuator of the present invention upon torsional deformation, and FIG. 8 is a cross-sectional view of a second preferred embodiment of the rotary motion linear actuator of the present invention.

DESCRIPTION OF THE PREFERRED EMBODIMENTS

Figure 1:
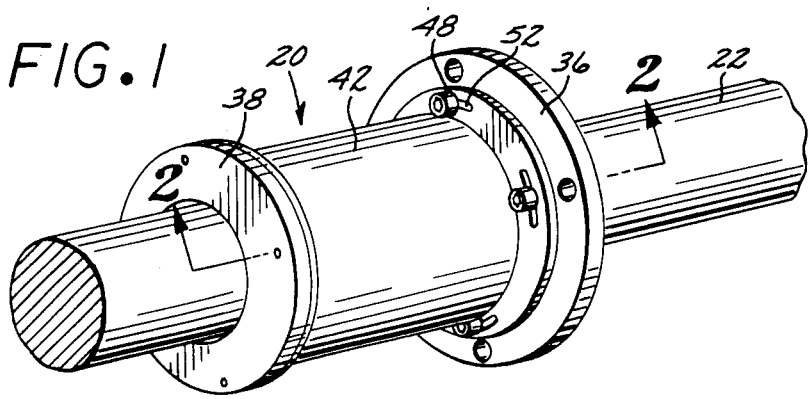
FIG. 1 is a perspective view of a first preferred embodiment of the rotary motion linear actuator of the present invention.

The following specification taken in conjunction with the drawings sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Referring now to FIGS. 1 through 7 of the appended drawings, the first preferred embodiment 20 of the rotary motion linear actuator of the present invention is disclosed. The rotary motion linear actuator of the present invention is adapted to be mounted on a shaft 22 which is rotatable about its longitudinal axis by a suitable power source, such as an internal combustion engine (not shown) or electric motor (not shown). A transmission mechanism (not shown), clutch (not shown), or like device may be mounted between the power source (not shown) and the rotatable shaft 22.

As is explained briefly in the introductory section of the present application for patent, the shaft 22 is rotated by the power source (not shown) to linearly move an object on the shaft. The object, which is not shown on the drawing Figures, may be a machine part, such as a carriage (not shown), a drawer (not shown) in a computer cabinet (not shown), a door, (not shown), a power operated automobile window (not shown), or the like. The object (not shown) is affixed to a third body (not shown) so that the object can not rotate about the shaft 22. As it will become readily apparent from the ensuing description, the rotary motion linear actuator of the present invention has a multitude of practical applications, and is well adapted for uses where substantially backlash free linear movement of great precision is required.

Figure 2:
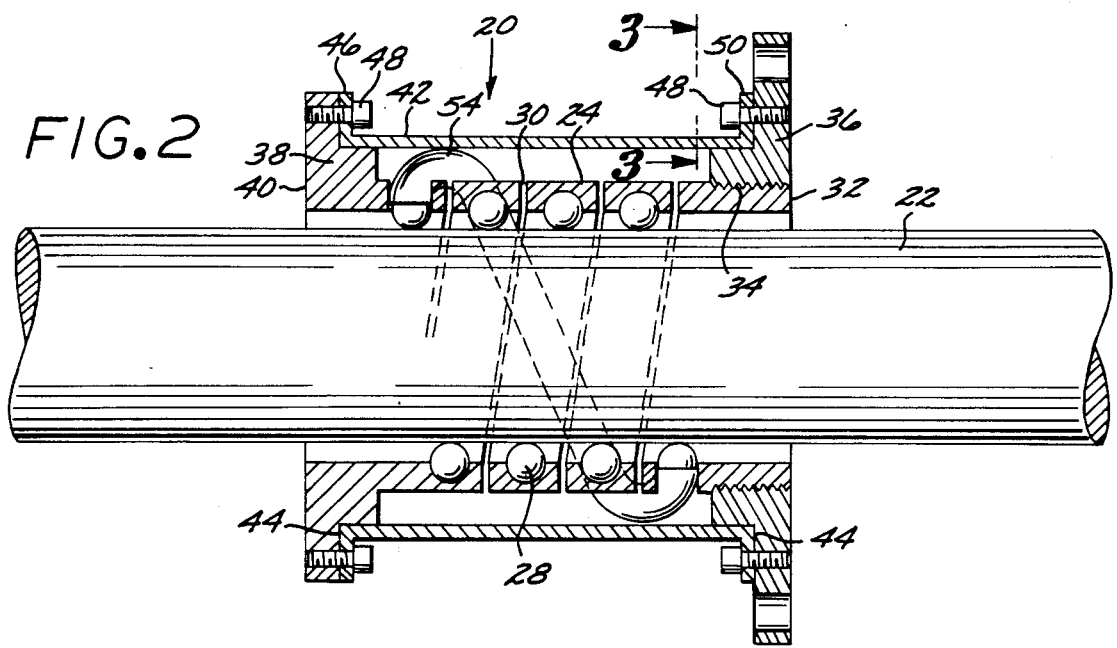
FIG. 2 is a cross-sectional view of the first preferred embodiment, the cross-section being taken on lines 2,2 of FIG. 1.
Figure 3:
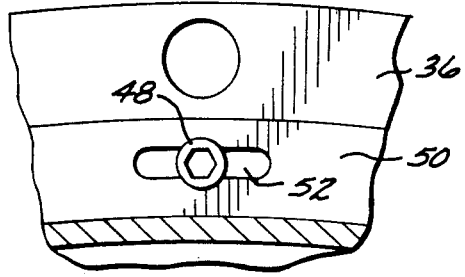
FIG. 3 is an enlarged view showing a detail of the first preferred embodiment.
Figure 4:
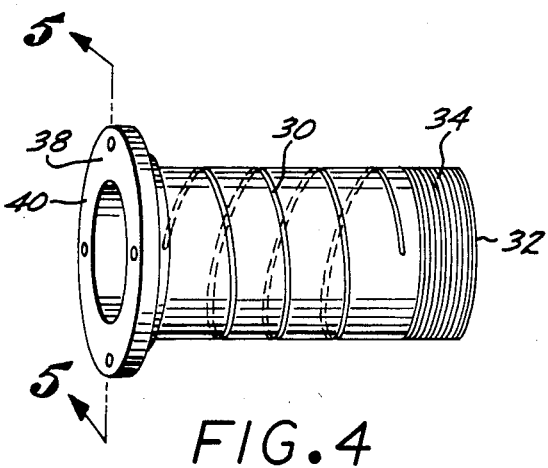
FIG. 4 is a perspective view of a modified ball nut of the first preferred embodiment of the rotary motion linear actuator of the present invention.

The first preferred embodiment 20 of the rotary motion linear actuator of the present invention is adapted to operate on a shaft having a substantially smooth exterior surface, such as the shaft 22 shown on FIGS. 1, 2 and 5. The diameter of the shaft 22 is not critical; typically the shaft 22 is of approximately ⅜ to 4 inches in diameter.

The rotary motion linear actuator of the present invention includes a modified ball nut 24 which has interior helical (Archimedes type) spiral grooves 26 adapted to receive a plurality of balls 28. The modified ball nut 28 is configured to be mountable on the shaft 22 with the balls 28 disposed in the spiral grooves 26 between the ball nut 24 and the shaft 22. The spiral grooves 26 in the modified ball nut 24 are substantially conventional.

The ball nut 24, however, is constructed so that it can be torsionally deformed about its longitudinal axis. As is shown on FIGS. 1 and 2, when the modified ball nut 24 is mounted on the shaft 22, its longitudinal axis coincides with the longitudinal axis of the shaft 22. To render the modified ball nut 24 capable of such torsional deformation, a slot 30 is disposed in the ball nut 24 substantially parallel with the spiral grooves 26.

In effect, the slot 30 causes the modified ball nut 24 to become a torsion spring, which when deformed torsionally, contracts in diameter. This is shown on the schematic views of FIGS. 6 and 7, with FIG. 6 showing the modified ball nut 24 in a relaxed state, and FIG. 7 showing the modified ball nut 24 in a deformed, contracted state.

It is an important feature of the present invention that the modified ball nut 24 is mounted upon the shaft 22 in a torsionally deformed state. Moreover, the extent of torsional deformation of the ball nut 24 is controllable in accordance with the present invention. For this reason, as is best shown on FIGS. 2, 4 and 5, a first end 32 of the ball nut 24 has a male thread 34 upon which an internally threaded first flange 36 is mounted. In the herein described preferred embodiments, a second flange 38 is unitarily constructed with the second end 40 of the ball nut 24. A body 42 which maintains the modified ball nut 24 in its torsionally deformed state is mounted to the first and second flanges 36 and 38. The body 42, carried by the ball nut 24 as the ball nut 24 moves on the shaft 22, is preferably a rigid tube such as torque tube shown on FIGS. 1 and 2. Alternatively, the body 42 itself to which the ball nut 42 is mounted, may be a coil spring.

The torque tube 42 has a relatively small flange at each end 44. The first flange 46 of the torque tube 42 is fixedly attached to the ball nut 24 by a plurality of screws 48. The second flange 50 of the torque tube 42 is also fixedly attached to the ball nut 24 by a plurality of screws 48. However, a plurality of longitudinal openings or slots 52 are provided in the second flange 50 to accomodate, when the screws 48 are not tightened, movement of the modified ball nut 24 relative to the torque tube 42 about the longitudinal axis of the ball nut 24. The openings 52 in the second flange 50 of the torque tube 42 are best shown on the enlarged view of FIG. 3.

A tube 54 or like conduit is incorporated in the modified ball nut 24 to conduct the balls 28 from one end of the spiral grooves 26 to the other end as the rotary motion linear actuator of the present invention moves on the shaft 22. The construction of the ball circulating tube or conduit 54 is substantially conventional, except that it is somewhat flexible so as to accomodate the torsional deformation of the modified ball nut 24, For this reason, the ball circulating tube 54 is preferably comprises copper, rather than steel tubing customary in prior art ball nuts.

For proper mounting of the rotary motion linear actuator of the present invention to the shaft 22, the screws 48 are first loosened to enable the second flange 50 of the torque tube 42 to move relative to the first flange 36 of the ball nut 24. The modified ball nut 24 is then torsionally deformed (twisted) to a desired extent. Thereafter, the screws 48 are tightened to maintain the modified ball nut 24 in its torsionally deformed state.

As it will be readily appreciated by those skilled in the mechanical arts, when the ball nut 24 is deformed similarly to a twisted coil spring (not shown), then the balls 28 disposed in the spiral grooves 26 are biased against the shaft 22 with a predetermined force. Whereas in a relaxed state of the modified ball nut 24 the rotational axes of the balls 28 is substantially parallel with the longitudinal axis of the shaft 22, in the torsionally deformed state of the ball nut 24 the rotational axes of the balls 28 are inclined to the longitudinal axis of the shaft 22. Therefore, when the shaft 22 rotates the balls 28 roll in a helical path on the shaft 22, and the rotary motion linear actuator of the present invention moves linearly on the shaft 22.

The biasing force on the balls 28 caused by the torsionally deformed status of the modified ball nut 24 also represents a pre-load on the shaft 22, so that the rotary motion linear actuator of the present invention has substantially no lost motion. This pre-load is readily adjusted by adjusting the torsional deformation of the ball nut 24 in the above-described manner.

In addition to substantially backlash free operation, the first preferred embodiment 20 of the rotary motion linear actuator of the present invention also has the following advantages. The first preferred embodiment 20 of the rotary motion linear actuator does not require a spiral groove machined shaft. This, of course, substantially reduces the cost of manufacturing the first preferred embodiment 20. Because load is carried in the rotary motion linear actuator of the present invention by a relatively large number of balls, much larger loads can be transmitted with the first preferred embodiment 20 than with prior art rotary motion linear actuators which have a smooth shaft. The first preferred embodiment 20 of the rotary motion linear actuator of the present invention can carry loads of up to approximately 1000 lbs.

Still further, when an overload develops on the first preferred embodiment 20 of the rotary motion linear actuator of the present invention, for example when the device encounters an inadvertent obstruction, the balls 28 will slip on the shaft 22 without causing serious damage to the shaft 22. The load or force at which the first embodiment 20 of the rotary motion linear actuator of the present invention slips or stalls is dependent on the pre-load on the balls 28. Therefore, such threshold overload is readily adjustable in accordance with the present invention.

Referring now to FIG. 8 of the appended drawings, a second preferred embodiment 56 of the rotary motion linear actuator of the present invention is disclosed. The modified ball nut 24 of the second preferred embodiment 56 is substantially identical with the modified ball nut 24 of the first preferred embodiment 20. In the second preferred embodiment 56, however, the ball nut 24 is mounted on a shaft 58 having a helical (Archimedes) spiral grooves 60. In other words, the shaft 58 is a substantially conventional shaft of a prior art ball screw ball nut combination. The torsionally deformed modified ball nut 24, however, provides an adjustable pre-load on the shaft 58 so that the second preferred embodiment 56 of the rotary motion linear actuator of the present invention has virtually no backlash or lost motion. Because in the second preferred embodiment 56 the shaft 58 also has helical grooves 60, the second preferred embodiment 56 can transmit larger loads or forces than the first preferred embodiment 20. Principal applications of the second preferred embodiment 56 are therefore in machinery, such as carriages (not shown) of material working tools (not shown).

Several modifications of the rotary motion linear actuators of the present invention may become readily apparent to those skilled in the art from the above disclosure. Therefore, the scope of the present invention should be interpreted solely from the appended claims.

What is claimed is:

1. A linear actuator adapted for converting rotary motion of a rotatable shaft having a longitudinal axis into linear motion, the actuator comprising:

a ball nut body having an interior cavity and configured for mounting the ball nut body on the shaft in substantially concentric relationship with the shaft, the ball nut body having a longitudinal axis and including a substantially helical ball screw thread formed in the interior of the ball nut body;

a plurality of balls disposed directly between the ball nut body and the shaft in the ball screw thread, each of the balls having respective rolling axes;

means for providing adjustment and maintaining a predetermined torsional and compressional deformation in the ball nut body about the longitudinal axis of the ball nut body and of the shaft whereby the plurality of balls disposed between the ball nut body and the shaft are urged against the shaft with their rolling axes at a predetermined inclined angle relative to the longitudinal axis of the shaft, the adjustment means for providing and maintaining including a helical slot formed and penetrating through the ball nut body itself, the helical slot being disposed parallel with the helical thread, and means for circulating the balls from substantially one end of the helical screw thread to substantially the other end of the helical screw thread for repeated rolling contact with the shaft.

2. The linear actuator of claim 1 wherein the shaft is of circular cross-section taken in a plane perpendicular to its longitudinal axis, and wherein the shaft has a substantially smooth exterior surface for rolling contact with the balls.

3. The linear actuator of claim 2 wherein the adjustment means for providing and maintaining a predetermined torsional and compressional deformation in the ball nut body further comprise a mounting body to which the ball nut body is mounted in a predetermined torsional and compressional configuration.

4. The linear actuator of claim 3 wherein the mounting body comprises a tube substantially enveloping the ball nut body.

5. The linear actuator of claim 4 further comprising means for adjustably fastening the ball nut body to the tube in a desired predetermined torsional configuration.

6. The linear actuator of claim 1 wherein the exterior surface of the shaft which interfaces with the ball nut body has a substantially helical ball screw thread.

7. A linear actuator adapted for converting rotary motion of a cylindrical shaft having a longitudinal axis and a substantially smooth exterior surface, into linear motion of the actuator, the actuator comprising:

a ball nut having a longitudinal axis, having internal substantially helical ball screw grooves, and a helical slot penetrating through the body of the ball nut substantially parallel with the ball screw grooves whereby the ball nut is capable of acting as a torsion spring about the longitudinal axis of the ball nut;

a plurality of balls disposed in the ball screw grooves directly in contact with the exterior surface of the shaft and with the screw grooves of the ball nut, each of the balls having rotational axes;

a mounting body;

adjustment means for mounting the ball nut to the mounting body in a predetermined torsional configuration and for maintaining the ball nut in said predetermined torsional and compressional configuration whereby the diameter of the ball nut is contracted and the balls are urged against the exterior surface of the shaft with their rotational axes having an inclined angle relative to the longitudinal axis of the shaft, and means for circulating the balls from substantially one end of the ball screw grooves to substantially the other end of the ball screw grooves whereby upon rotation of the shaft the balls describe a helical path upon the shaft and the actuator moves linearly on the shaft.

8. The linear actuator of claim 7 wherein the mounting body is a substantially rigid tube substantially enveloping the ball nut.

9. The linear actuator of claim 8 further comprising means for mounting an object such as a carriage, machine part or the like to the actuator, said object to be moved linearly with the actuator.

10. A ball nut assembly adapted to be mounted on a shaft having a longitudinal axis to be linearly moved thereon, the ball nut assembly comprising:

a ball nut having a longitudinal axis, an interior cavity and a substantially helical ball screw thread formed in the wall of the interior cavity, the ball nut further having a spiral slot which penetrates through the body of the ball nut and has substantially the same pitch as the ball screw thread formed in the ball nut, the screw thread containing a plurality of balls directly between the ball nut and the shaft, the balls having rotational axes, because of the spiral slot the ball nut providing a substantially reversible torsional deformation about the longitudinal axis of the ball nut, whereby diameter of the ball nut is contracted;

a mounting body carried by the ball nut;

adjustment means for mounting the ball nut to the mounting body in a torsionally and compressably deformed state whereby when the ball nut assembly is mounted to the shaft, the plurality of balls are urged against the shaft with their rotational axis at an inclined angle to the longitudinal axis of the shaft, and means for circulating the balls from substantially one end of the ball screw threads to substantially the other end of the ball screw threads.

11. The ball nut assembly of claim 10 wherein the mounting body is a substantially rigid tube which substantially envelopes the ball nut.

12. The ball nut assembly of claim 10 further comprising means for mounting an object to the ball nut assembly, said object to be moved linearly by the ball nut assembly.

13. In a ball nut assembly adapted to be mounted on a shaft having a longitudinal axis to be linearly moved on the shaft upon rotary motion of the shaft, and adapted to carry an object in a linear motion, the ball nut assembly including a ball nut having a longitudinal axis and an interior in which a ball screw groove having substantially helical internal ball screw threads containing in conjunction with the shaft a plurality of force transmitting balls is formed, the improvement comprising:

adjustment means for maintaining a predetermined torsional and compressional deformation in the ball nut about the longitudinal axis of the ball nut and of the shaft, whereby the balls disposed between the shaft and the ball nut are urged against the shaft with a predetermined force wherein the adjustment means comprise a spiral slot disposed in the ball nut substantially parallel with the helical ball screw threads, the spiral slot rendering the ball nut into a springy body and capable of said torsional and compressional deformation.

14. The improvement of claim 13 wherein the means further comprise a mounting body mounted to the ball nut and maintaining the ball nut in the predetermined torsional deformation.

15. The improvement of claim 14 further comprising means operatively associated with the ball nut and the mounting body for adjusting the torsional deformation of the ball nut.

* * * * *

UNITED STATES PATENT AND TRADEMARK OFFICE
CERTIFICATE OF CORRECTION

PATENT NO. : 4,660,431

DATED : April 28, 1987

INVENTOR(S) : Otto R. Heine

It is certified that error appears in the above-identified patent and that said Letters Patent are hereby corrected as shown below:

Column 1, line 8, delete "a".

Column 2, line 5, change "shaft" to --shafts--.

Column 4, line 53, add "the" after "torque"; line 64, change "accomodate" to --accommodate--.

Column 5, line 7, change "accommodate" to --accommodate--; line 8, change "," to "." after "24"; line 9, delete "is"; line 26, change "is" to --are--; line 27, change "," to "."

line 27, "in" to -- In --.

Column 7, line 6, add --and compressional-- after "torsional"; line 27, add --and compressional-- after "torsional".

Column 8, line 6, add --the-- before "diameter"

Signed and Sealed this

Tenth Day of November, 1987

Attest:

DONALD J. QUIGG

Attesting Officer

Commissioner of Patents and Trademarks